UNITED STATES PATENT OFFICE.

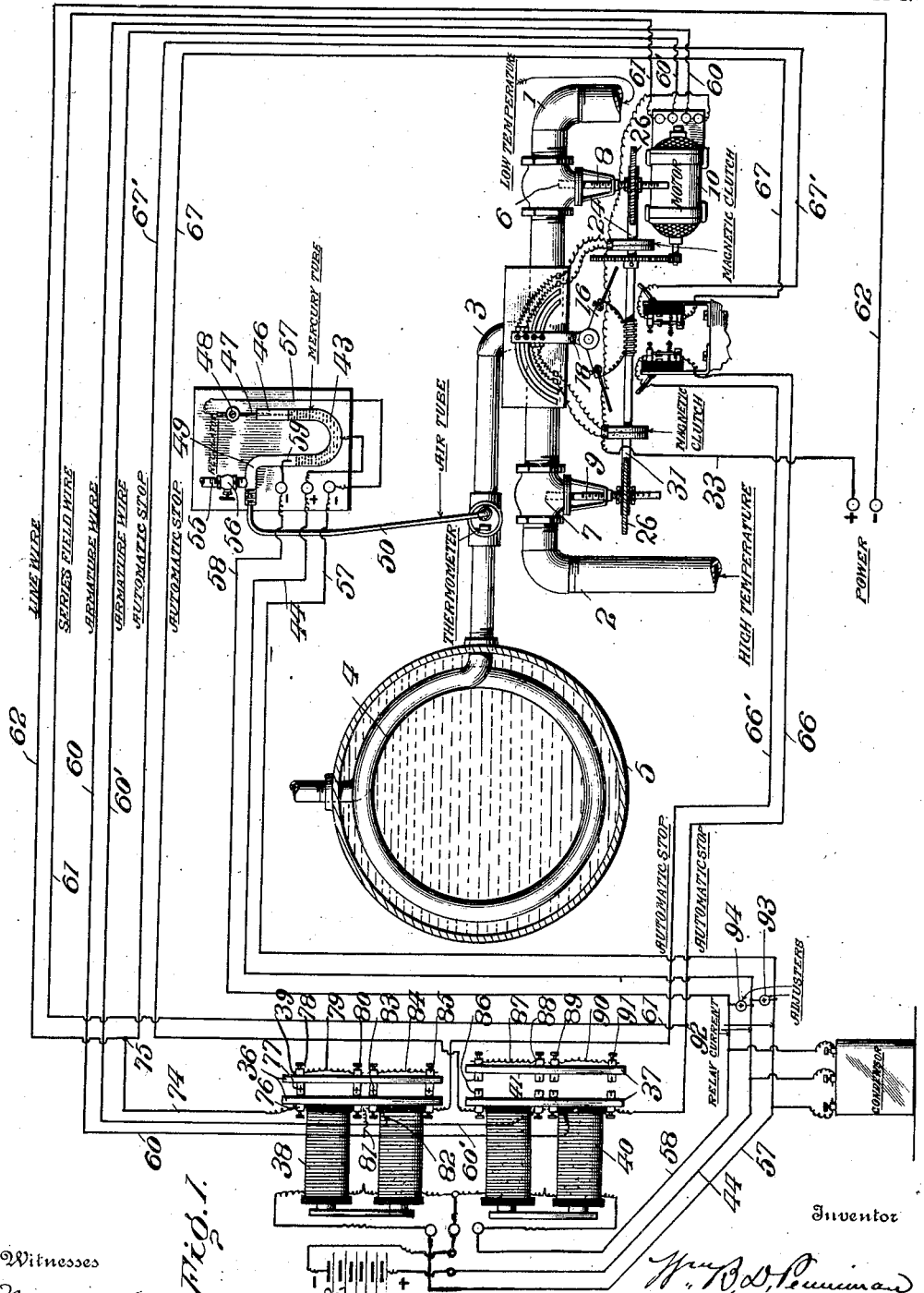

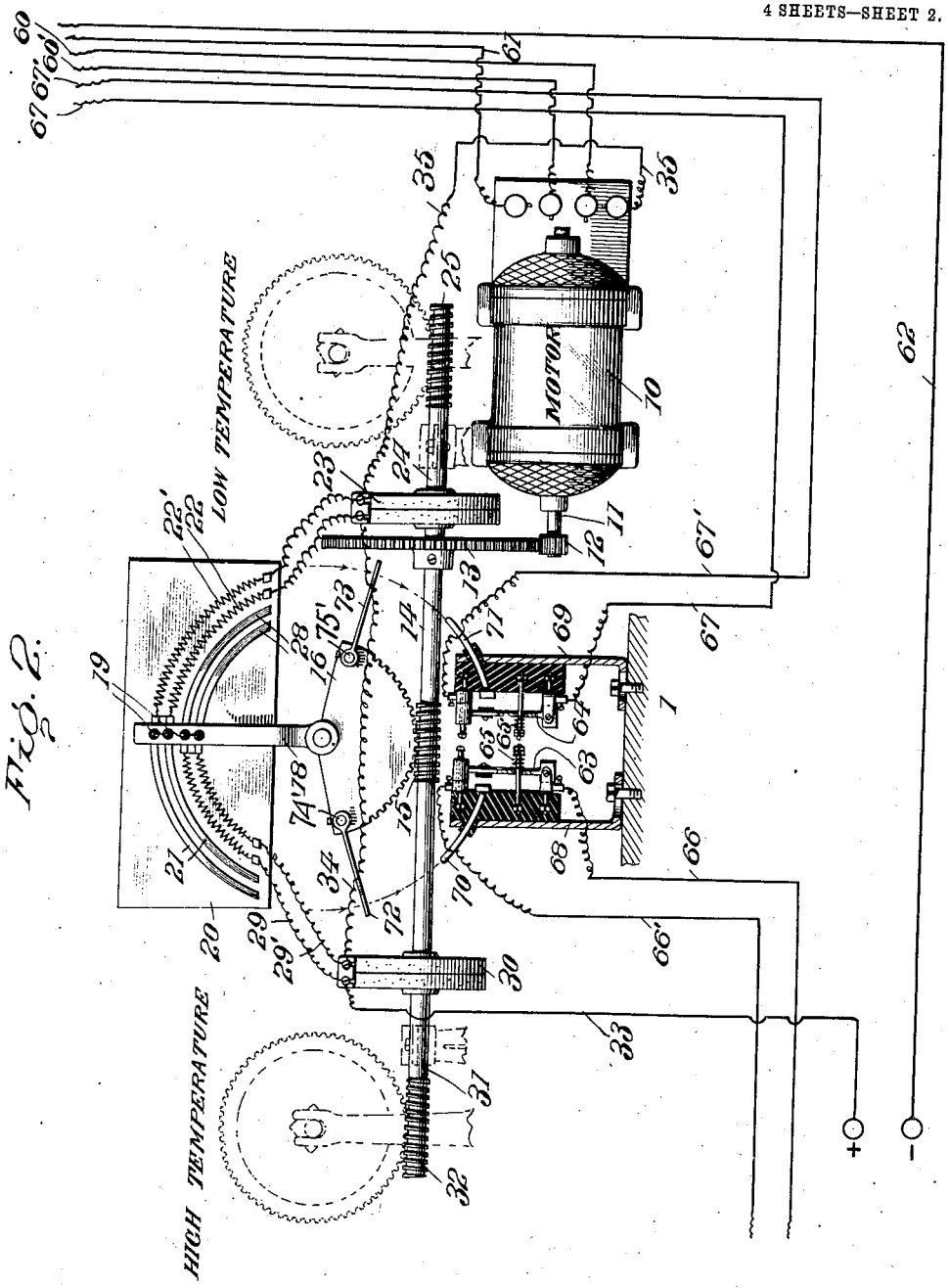

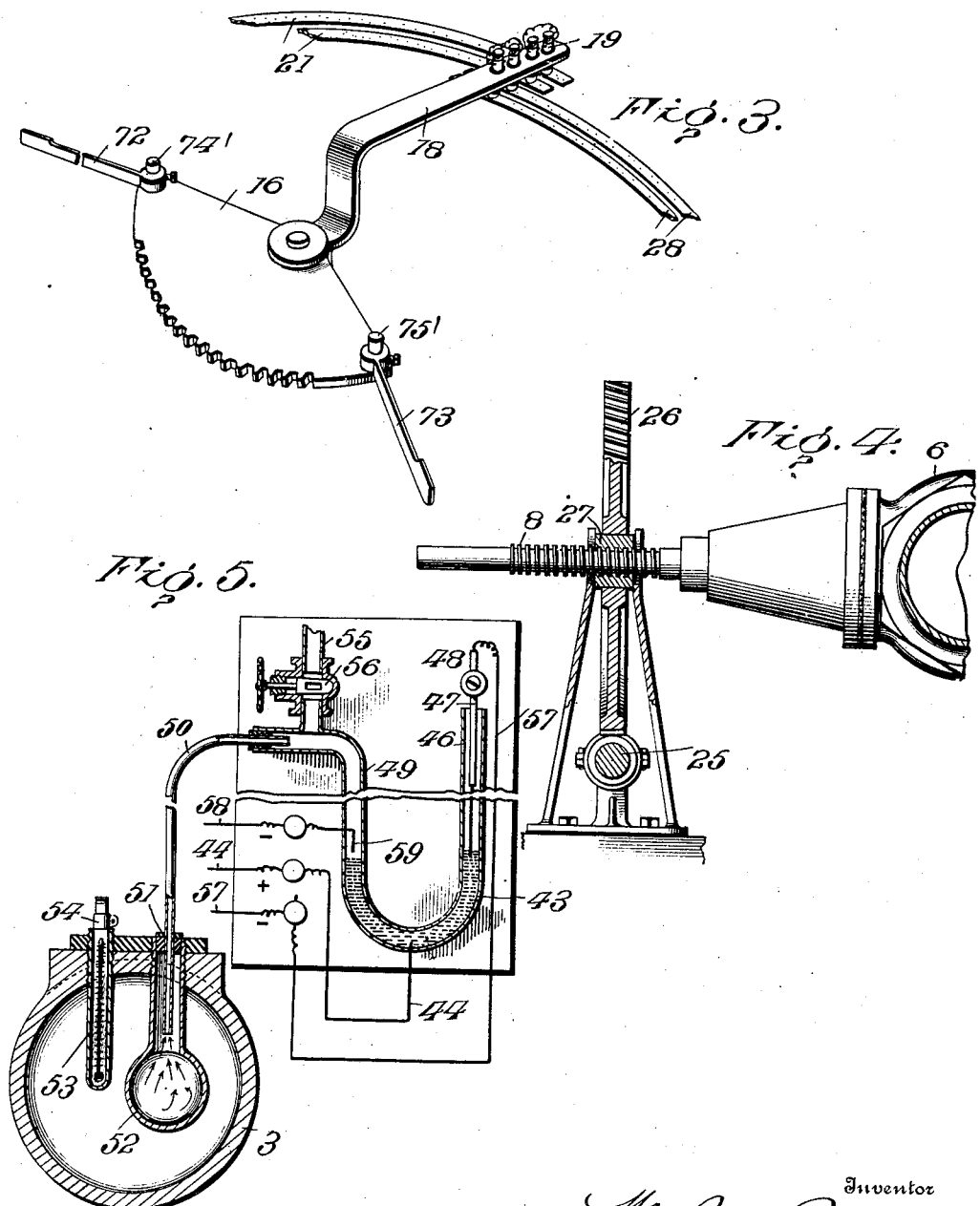

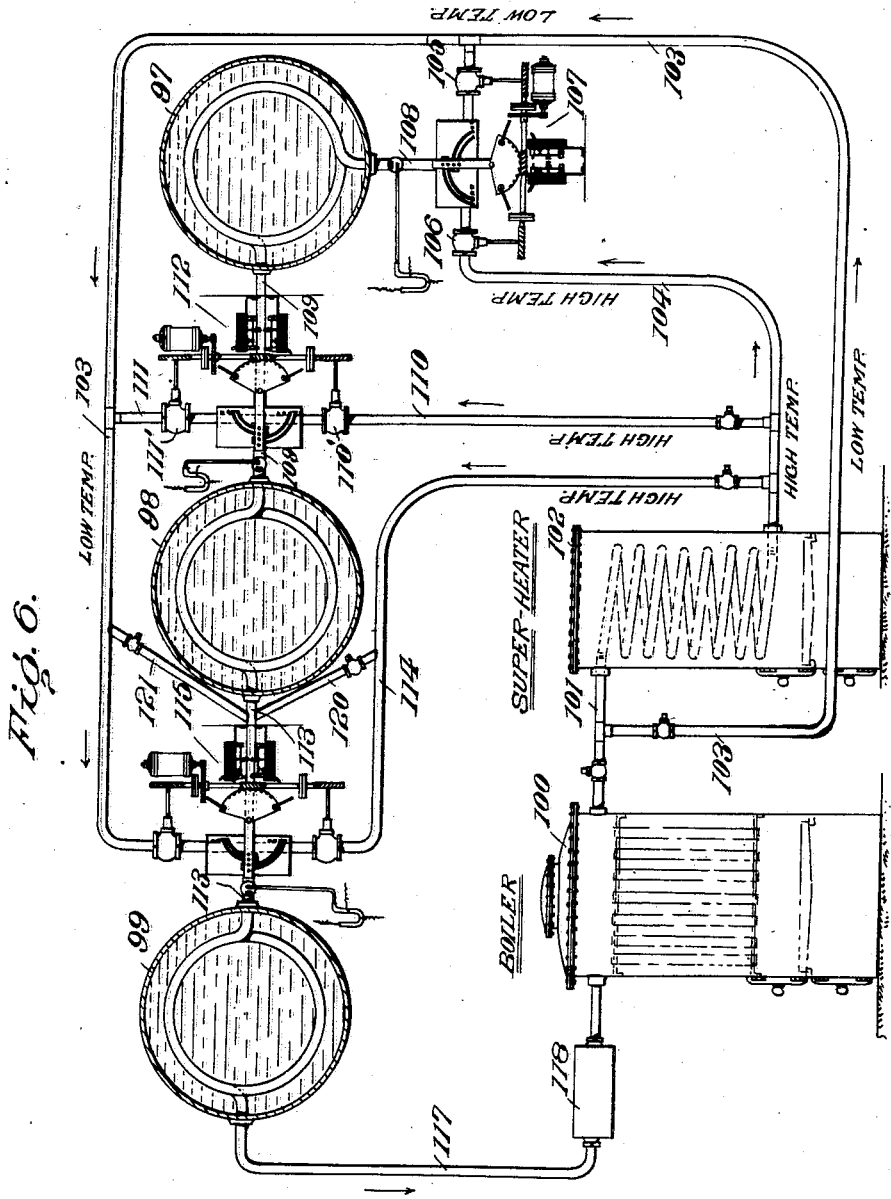

WILLIAM B. D. PENNIMAN, OF BALTIMORE, MARYLAND.

TEMPERATURE-CONTROLLING DEVICE.

933,577.

Specification of Letters Patent. Patented Sept. 7, 1909.

Application filed November 20, 1905. Serial No. 288,255.

*To all whom it may concern:*

Be it known that I, WILLIAM B. D. PENNIMAN, of Baltimore, Maryland, have invented a new and useful Improvement in Temperature-Controlling Devices, which invention is fully set forth in the following specification.

This invention relates to the art of regulating temperatures, and more particularly to the regulation of the temperature of a heating or refrigerating medium, such as steam or brine, passing through a conduit in which it is desired the temperature shall be practically uniform. In my Patent No. 766,841, granted August 9, 1904, I have disclosed an apparatus and method for effecting this purpose, which apparatus, however, is not automatic but depends upon the manipulation of the valve mechanism of the apparatus by the workmen. And in my application Serial No. 266,649, filed June 23, 1905, I have disclosed automatic means for manipulating the valve mechanism whereby the temperature in the conduit in which the heating or refrigerating medium is utilized, may be controlled to a small fraction of a degree. In said last-named application there is disclosed a conduit supplied with a high temperature medium and a conduit supplied with a low temperature medium which two conduits both deliver into or communicate with the main conduit, wherein the heating or refrigerating effect of the medium is utilized, the amount of heating or refrigerating medium passing through said high and low temperature conduits being controlled by two connected valves which are simultaneously operated by a single motor so that one of said valves moves toward open position while the other moves toward closed position, or vice versa. In some cases, however, it is found desirable to change the amount of fluid delivered to the main conduit by one of the high or low temperature conduits without altering the amount delivered by the other; or it may be desirable to deliver fluid to the main conduit from the high or the low temperature conduit only, the other remaining entirely cut off or closed.
Thus, where a heating or refrigerating medium flowing through a main conduit is found to be below or above the temperature required for the desired use, such temperature may be raised by opening a valve and admitting fluid from the high temperature conduit, the valve in the low temperature conduit being closed; or the temperature in the main conduit may be lowered by opening the low temperature valve while the high temperature valve is closed. An illustration of this character is found where a main heating conduit is passed through a series of stills. As the heating medium emerges from one still its temperature may be found to be less than that required in the next succeeding still, in which case it is necessary to raise or "boost" the temperature by admitting fluid from the high temperature conduit while the low temperature conduit remains closed. On the other hand, if the temperature is higher than is desired for the next succeeding still it may be lowered by admitting fluid from the low temperature conduit while the high temperature conduit is closed.

It is one of the leading objects of the present invention to provide automatic means whereby this independent raising or lowering of the temperature in the main conduit may be accomplished.

With this object in view the invention consists of a high and low temperature conduit, each delivering into a third or main conduit, each of said high and low temperature conduits being provided with a valve controlling the passage of the heating or refrigerating medium therethrough, a motor for operating said valves independently of each other, and automatic mechanism controlled by the temperature in or emanating from the main conduit for selecting or determining which of said valves shall be operated, and the direction of operation thereof. Specifically stating the construction by which this is accomplished, there is a motor which, for the purpose of illustration is herein shown as an electrical motor, geared with a main operating shaft, which motor is provided with clutch mechanism whereby it may be connected to and caused to operate a shaft imparting motion to either of the respective valves in the high or low temperature conduits. Preferably the clutch mechanism, when an electrical motor is employed, is of the class known as magnetic clutch, and as here shown there are two of such clutches, one for connecting the main power shaft to each of the shafts for operating the respective valves. The current for operating the motor is made to pass through the magnetic clutch mechanism of the particular valve which it is desired to operate, but is automatically shunted around the magnetic clutch of the valve which it is desired should not be operated, and the direction of the current through the motor, and hence the direction in which the particular valve is operated thereby, is controlled by a temperature device subject to the influence of the medium (whether heating or refrigerating) in or emanating from the main conduit. There is also provided, as in my previous apparatus, automatic stop mechanism which, when the valve being operated has reached the desired limit of its throw, acts to cut off the power from the motor and stop the operation.

The particular arrangement and construction of the apparatus will hereinafter be more specifically described.

It will be understood that the inventive idea is capable of being embodied in a variety of mechanical structures without departing from the spirit of the invention. The preferred construction, however, is embodied in the accompanying drawings, in which—

Figure 1 is a diagrammatic plan of the apparatus; Fig. 2 is a like diagrammatic view illustrating the clutch mechanism and the automatic stop mechanism on an enlarged scale; Fig. 3 is a detail of the part of the apparatus for switching the main current through or around the magnetic clutch mechanism, as may be desired; Fig. 4 is a detail of one of the valve stems and the gearing connected thereto; Fig. 5 is a sectional detail showing the means for automatically controlling the motor by the temperature in or emanating from the main conduit, and Fig. 6 is a diagrammatic view, showing a series of stills and valve mechanism therefor.

Referring to the drawings, in which like numerals indicate like parts, 1 is a conduit for the low temperature current, 2 is the conduit for the high temperature current, which two conduits unite or deliver into the main conduit 3 which leads to any suitable place where the heating or refrigerating effect of the medium is to be utilized, here shown as forming a coil 4 in a still 5, shown in section in Fig. 1. In the low temperature conduit 1 is a valve 6 and in high temperature conduit 2 is a valve 7, whose respective valve stems 8 and 9 project outwardly and are provided with screw-threads, as clearly shown in Figs. 1 and 4. An electrical motor 10, which is preferably a series wound motor, has on the end of its shaft 11 a small gear wheel 12 gearing with a large gear wheel 13 keyed to the main driving shaft 14, which shaft 14 has thereon a worm 15 gearing with gear teeth on a segmental gear 16, to which segmental gear there is secured an arm 18. This arm 18 carries near its outer extremities four contact points 19 properly insulated therefrom, which points, when the arm is in its medial position (i. e., the position shown in Figs. 1, 2 and 3), contact with four brass strips suitably insulated from and supported upon a base 20. Two of these brass strips 21 are connected by suitable wire 22, 22', with the two members of the magnetic clutch 23, one of said members being secured to the main shaft 14 and the other being secured to a shaft 24 having on its other end a worm 25 gearing with a worm gear 26 which has at its hub or center a nut 27 on the screw-threaded stem 8 of the low temperature valve 6, all as will be readily understood from an inspection of Figs. 1, 2 and 4. The other two brass strips 28 are connected by wires 29, 29' to clutch mechanism 30, one of the members of which clutch is secured to the shaft 14 and the other of which is secured to the shaft 31 having the worm 32 connected to and operating the valve stem of the valve 7 precisely as the worm 25 is connected to and operates the valve stem of the valve 6, as above described.

The direction in which either one of the valves 6 or 7 will be operated by the mechanism just described will depend upon the direction of the current passing through the motor; and when the motor is in operation and neither of the magnetic clutches 23 and 24 is energized or rendered operative as a clutch, the main shaft 14 will be operated by the motor without affecting either of the shafts 24 or 31 and hence without operating either of the valves 6 or 7. If, however, the clutch 23 is rendered effective or operative, the shaft 25 and the valve 6 will be operated, the direction in which said valve moves depending upon the direction of the current through the motor, as above stated; and if the clutch 30 is operative while the clutch 23 is not, then the valve 7 will be operated, its direction of movement being likewise dependent upon the direction of the current through the motor.

The contact points 19 on the arm 18 of the segment 16 are in electrical contact with the two pairs of brass strips 21 and 28 when the arm 18 is in the medial position, illustrated in Figs. 2 and 3, and the said brass strips afford a path of less resistance to the passage of the current than is offered by the mechanism of the magnetic clutches 23 and 30. It follows that when the contact points 19 bear upon both pairs of brass strips connected with the respective clutches, no current will pass through said clutches but will take the line of least resistance through the brass strips, and hence the magnetic clutches will not be energized. If, however, the arm 18 is swung a slight distance either to the right or to the left, the contact points 19 carried thereby will pass off of one pair of brass strips 21 or 28, as the case may be, while remaining in contact with the other pair, and the only path for the current coming in over the main wire 33 from the source of power will necessarily be through the magnetic clutch connected with the pair of brass strips from which the contact points have passed. Thus, for example, let it be assumed that the parts are in the position shown in Fig. 2: current passing in over the wire 33 will pass via wire 29 to the pair of brass strips 28, through the connected contact points bearing on said strips to the wire 29' and thence via the wire 34 to but not through the clutch 23, via the wire 22, to the pair of contact points bearing on the pair of brass strips 21 and via the wire 22' to the wire 35 leading directly to the motor, thus setting the motor in operation, and by reason of the consequent revolution of the shaft 14 the segment 16 will be swung around say to the right, carrying one pair of contact points off of the pair of brass strips 21, but leaving the other pair contacting with the pair of brass strips 28. As soon as the contact points 19 have passed from the pair of brass strips 21, the current would pass via the wire 33, wire 29, contact points 19, brass strips 28, wire 29', back to but not through the clutch mechanism 30, and this clutch mechanism would therefore remain inactive and the revolution of shaft 14 would not impart revolution to shaft 31. Current, however, would pass from the wire 29 to the wire 34 and thence to the clutch mechanism 23. Inasmuch as the contact points 19 do not bear upon the brass strips 21, the current could not pass through the wires 22, 22', and would therefore be compelled to pass through the magnetic clutch 23, energizing the same, and clutching the shaft 14 to the shaft 25, the current passing from the clutch 23 via wire 35 to the motor. This would result in the operation of the shaft 25 and the valve 6 operatively connected thereto. Had the current passed through the motor in a reverse direction, the clutch 23 would have remained inactive, the clutch 30 would have been energized and the valve 7 operated, as will be readily understood.

For the purpose of determining the direction of the current through the motor 10, a pair of switches 36, 37, Fig. 1, are employed. One member of the switch 36 is carried on the front of a pair of electromagnets 38, the other member of the switch being carried on armature 39 of said magnets, and likewise one member of the switch 37 is carried on the end of electromagnets 40 while the other member is carried on the armature 41 of said magnets 40.

Current for energizing the electromagnets 38 and 40 is had from any suitable source, here shown as a battery 42; and means automatically controlled by the temperature in or emanating from the main conduit 3 are provided for directing the energizing current through either the electromagnet 38 or the electromagnet 40, as the case may be, whereby one of such magnets will be energized while the other is inactive; or if the temperature in the main conduit is precisely at the desired point both of said magnets 38 and 40 will remain inactive. For the purpose of thus controlling the energization of the magnets 38 and 40, and hence the throwing of the switches 36 and 37 controlled thereby respectively, there is provided a U-tube 43, shown in Figs. 1 and 5, which tube is partially filled with mercury, said mercury being in electrical contact with the terminal of the wire 44 leading to one side, here shown as the positive side, of the battery 42, the mercury being always in contact with the terminal of the wire 44. One leg, as 46 of the U-tube 43, is open to the atmosphere at its end and has supported therein in any suitable manner an electrode 47, capable of being adjusted up and down by any suitable means, as by a set-screw 48; the other leg 49 of the U-tube is closed at its end and has leading thereinto an air-tube 50 which leads through a hermetic joint 51 to the interior of an air-chamber 52, preferably in the form of a bulb composed of copper or other suitable conductor of heat, which air-chamber 52 is preferably located either within the main conduit 3 or within the chamber or medium whose temperature is to be determined by the temperature of said main conduit. As shown, the air-chamber 52 is located directly in the main conduit, but it might with equal effect be located in the material to be distilled within the still 5 where it would be subjected to the temperature emanating from the main conduit 3. There is also located either in the main conduit, or in the material whose temperature is to be controlled thereby, an open socket 53 subject to the same influences as the air-chamber 52. This socket 53 is in the form of a tube closed on its inner end but open at its outer end, and within the same there may be placed a thermometer 54 for determining the temperature of the heating or refrigerating medium in the conduit 3 or of the material in the still 5, as may be desired. The leg 49 of the U-tube 43 is provided with a vent conduit 55 opening into said leg 49 and also opening into the atmosphere, which conduit 55 is controlled by a valve 56 capable of completely opening or completely closing the same, as may be desired.

Leading from the battery 42 and from the side thereof opposite to that in which the wire 44 is connected is a wire 57 connected to the electrode 47 and a wire 58 connected to an electrode 59 within the leg 49 of the U-tube 43, the lower ends of the electrodes 47 and 59 being approximately upon the same level.

When the valve 56 is open the mercury in the U-tube will stand at the same level in each of the legs 46 and 49 of said tube, and out of contact with both of the electrodes 47 and 59. If, however, the valve 56 is closed the air in the air-chamber 52 will be affected by the temperature of the medium in the main conduit 3 or within the still 5, as the case may be, and the air in said air-chamber 52 and consequently in the leg 49 of the U-tube 43 will be either expanded or contracted, depending upon whether the temperature in the chamber 52 has been raised or lowered after the closing of the valve 56. Assuming, for the sake of illustration, that the temperature in the main conduit 3 has increased, the air in the air-chamber 52 would be subject to this rise of temperature and would consequently be caused to expand and would exert an increased pressure upon the surface of the mercury in the leg 49 of the U-tube, thereby depressing that surface slightly and causing the surface of the mercury in the leg 46 of the U-tube to rise, and when this has been carried to a sufficient degree the mercury would contact with the lower end of the electrode 47 and thereby close the circuit from the battery 42 through the wire 44, the mercury in the U-tube, the electrode 47 and the wire 57, thus energizing the electromagnet 38 and causing it to attract its armature and close the switch 36. This condition of affairs is illustrated in Figs. 1 and 5. Should, however, the temperature within the main conduit 3 fall, the air in the chamber 52 would have its temperature lowered with a resultant lowering of the pressure on the mercury in the leg 49 of the U-tube, thus causing the atmospheric pressure in the open leg 46 of the U-tube to depress the mercury in that leg and raise it in leg 49 until contact is made between the mercury and electrode 59, in which case current from the battery 42 would be closed through the wire 44, the mercury, the electrode 59 and the wire 58, and the electromagnet 40 would be energized and the switch controlled thereby be closed, while the switch controlled by the magnet 38 would be opened by a suitable spring not shown.

Referring to Fig. 1, 60 and 60′ are wires leading to the opposite sides of the armature of the motor, and 61 is a conductor leading to the series winding of the motor, while 62 is the return wire leading to the main source of current.

Referring to Fig. 2, 63 and 64 are a pair of switches held normally closed by springs 65, 65′. One member of the switch 63 is connected to wire 66 while the other member is connected to a wire 66′ and one member of the switch 64 is connected to a wire 67 and the other member of said switch is connected to a wire 67′. These switches 63 and 64 are supported on suitable standards 68 and 69 from which they are properly insulated and have a pair of pins 70 and 71 mounted so as to have sliding movement through the insulation on which the switches are supported, the ends of said pins being in the line of movement of arms 72, 73, carried on the segment 16. These arms are preferably adjustable by means of the engagement of their hub-like ends with pins 74′ and 75′ on said segment to which pins they are connected, as by set-screws, as clearly illustrated in Fig. 3. When the segment 16 is thrown around to near the limit of its desired movement in either direction, the arm 72 or 73, as the case may be, contacts with one or the other of the pins 70 or 71 and forces the same against the switch 63 or 64 and opens the switch against the tension of the springs 65 or 65′ associated with said switch. But when the arms 72 or 73 are out of contact with the said pins 70 or 71, the switches are held closed by the tension of springs 65, 65′, and the current is free to pass through said switches, as will be readily understood.

Turning now to Fig. 1, there is a branch wire 74 connected at the point 75 to the line wire 62 and the automatic stop wire 67′, said branch wire being connected at binding post 76 to the contact point 77 carried by one member of the switch 36 which, when said switch is closed, is in electrical connection with binding post 78 connected by a wire 79 to binding posts 80 in electrical connection with a branch wire 81 connected to the wire 60. The wire 60′ is connected by a branch wire 82 through contact points 83 with a wire 84 connected through contact points 85 with the automatic stop wire 66′. In like manner the automatic stop wire 67 is connected through contact points 86 with the wire 87 on switch 37, which wire 87 is connected through contact points 88 to the wire 60′. Likewise the wire 60 is connected through contact points 89 with a wire 90 and through contact points 91 with automatic stop wire 66, the above-defined connections being completed only when the respective switches are closed and the connections being broken when the respective switches are open.

Operation: In the operation of the device it will, of course, be understood that the temperature of the medium flowing through the high temperature conduit is above and that flowing through the low temperature conduit is below the desired temperature in the main conduit, and hence by the proper introduction of the mediums from the high and low temperature conduits into the main conduit, any desired temperature in said main conduit between that of the high and the low temperature conduits may be obtained. It should also be mentioned that the wires 44, 57 and 58 leading from the U- tube to the battery 42 are capable of being connected by suitable adjusting switches, labeled in the drawings "adjusters," which switches are controlled by any suitable switch mechanism, as a press-button. These switches are shown at 93 which is a normally open switch capable of being closed by a press-button to connect wires 44 and 57 and at 94 which is a like switch connecting wires 44 and 58. It will be understood that the circuit from the battery may be closed through these switches, thereby energizing electromagnets 38 and 40 for closing the respective switches controlled by said magnets.

Let it be assumed that valves 6 and 7 (Fig. 1) controlling conduits 1 and 2 were so adjusted when their stems were connected to the shafts 24 and 31, as to permit approximately the right amounts of low and high temperature medium to pass through conduits 1 and 2 to obtain the desired temperature in main conduit 3. This would place each of the valves in a partly open position at the commencement of the operation. The valve 56 in the vent conduit 55 being turned so as to place the leg 49 of the U-tube in communication with the atmosphere, the operator observes the temperature indicated by the thermometer 54, and if it is above the desired temperature in the main conduit he proceeds to operate the device so as to adjust one or the other of the valves 6 or 7 to lower the temperature; or, if the temperature is below that desired in the main conduit, he adjusts one or the other of the valves 6 or 7 to raise the temperature in the main conduit. Let it be assumed, for example, that the temperature is higher in the main conduit than is desired. In this case the operator presses the adjuster button 93, thereby closing the circuit through wires 44 and 57 and energizing magnet 38, causing it to attract its armature and thereby close the circuit through the switching contact points at the switch 36. Thereupon current passes in over the main wire 33 to, but not through the clutch 30, along wire 29, contact points bearing upon brass strips 28, wires 29′ and 34 to wire 22, contact points bearing upon brass strips 21, wires 22′ and 35 to the series field of the motor, out through the series field wire 61 and along said wire to the point 92, along automatic stop wire 66 through the automatic stop 63, out over the automatic stop wire 66′, contact points 85, wire 84, contact points 83, wire 82, to armature wire 60′, through the armature of the motor, out over armature wire 60, to the wire 81 through the contact points 80, wire 79, and contact points 78 and 76 to the wire 74 and point 75, and thence to the line wire 62. Inasmuch as the current does not pass through either of the clutches 23 or 30, the revolution of the shaft 14 imparted to it by the motor 10 will not actuate either of the shafts 24 or 31, and hence neither of the valves 6 or 7. The shaft 14, however, will be set in motion by the motor in such a direction as to shift the arm 18 say from right to left in Figs. 1 and 2, thereby throwing the contact points 19 off of brass strips 28. As soon as this occurs the current can no longer pass via wires 29, 29′, since the circuit will be broken when the contact points move off of the brass strips 28, and the current will therefore pass through the magnetic clutch 30 and this clutch will be energized, thus connecting the shafts 14 and 31 and operating the high temperature valve so as to partially close the same. By this means the temperature in the main conduit will be lowered until it reaches the degree desired, whereupon the operator removes his finger from the push-button 93, thereby permitting the switch connecting the wires 44 and 57 to open, deënergizing electromagnet 38 and permitting switch 36 to open and thus interrupting current to the motor and stopping the same. The air in the air-bulb 52 will be expanded by the temperature in the main conduit 3, and as soon as the valves have been adjusted so that the temperature in the main conduit is at the point desired, the operator closes the valve 56. At the time the valve is thus closed the mercury in the U-tube will be at the same level in both legs and just out of contact with both of the electrodes 47 and 59, and since no current is flowing from the battery 42 through either of the electro-magnets 38 or 40, both of the switches 36 and 37 will be open.

Still referring to Fig. 1, let it be assumed that the device is in operation, and that for any reason the temperature in the main conduit 3 rises above that in the main conduit at the time the stop-cock in the escape nozzle 55 was closed. In that case the air in the air-chamber or bulb 52 would be further expanded by the rise of temperature in the main conduit, thus increasing the pressure upon the mercury in the leg 49 of the U-tube, depressing the same and correspondingly raising the mercury in the leg 46 of said tube, thus causing the mercury in said leg 46 to contact with the electrode 47, thereby closing the circuit from the battery 42 through the wires 44 and 57 and energizing the magnet 38 and closing the switch 36. This is the condition of affairs illustrated in Figs. 1 and 5 of the drawings. When this occurs current will pass in over the wire 33, taking the same course precisely as above indicated, when the operator closed the circuit by pushing the adjuster button 93, and the motor would be operated to move the valve 7 toward closed position, and would continue to so operate until the valve 7 was entirely closed, or until the temperature in or emanating from the main conduit was lowered to the degree to which the device was set to operate when the valve 56 was closed. When the temperature is thus lowered to the desired degree, the air in the air-bulb or chamber 52 would have its temperature correspondingly lowered and the contraction of the air in said air-bulb (and consequently in the leg 49 of the U-tube) would lower the pressure in said tube to a point where it would just counterbalance the atmospheric pressure in the open leg 46, when the mercury in said leg 46 would fall away from the electrode 47; and while the mercury would also be raised in the leg 49 it would not be raised to a point sufficient to contact with the electrode 59. The circuit from the battery 42 through the electromagnet 38 would therefore be broken and the switch 36 would be opened, thus interrupting the circuit to the motor, thereby stopping the motor and leaving the valve 7 in its partially closed position, and valve 6 open. Under these circumstances, should the temperature in the main conduit fall below the degree to which the device was set, the mercury in the leg 49 of the U-tube would rise by reason of the contraction of the air in such leg and the atmospheric pressure in the leg 46, thus closing the circuit through wires 44 and 58 and energizing the magnet 40. In this case the switch 37 would be closed while the switch 36 would be opened, and current would pass over wire 33 through the magnetic clutch 30 and wire 34 to the clutch 23, but not through the same, wire 22, brass strips 21, and contact points 19, wire 22' and wire 35 to the motor as before, through the series field of the motor and series field wire 61 to the point 92 and thence to contact points 91, wire 90, contact points 89, out over wire 60 to the armature of the motor, out through armature wire 60' to contact points 88, wire 87, contact points 86, automatic stop wire 67, through the automatic stop 64, thence through wire 67' to the point 75, and thence out over the line wire 62. This would cause the motor to operate in the reverse direction from that described above (when moving valve 7 toward closed position) thereby swinging the arm 18 from left to right, i. e., back toward the medial position shown in Figs. 1 and 2. Since the contact points 19 are off of strips 28 the clutch 30 will be energized and valve 7 will be moved toward open position. This movement of the valve 7 may continue till the valve 7 is fully opened, unless in the meantime the temperature in the main conduit 3 rises to the degree to which the device is set. Should the temperature still be too low, the arm 18 would continue to move from left to right past the medial position. As it passed the medial position points 19 would contact with strips 28, thereby deënergizing clutch 30 and disconnecting the motor from valve 7, and as soon as the contact points 19 leave the brass strips 21 the clutch 23 is energized, thereby connecting the power shaft 14 with the shaft 24 which operates the low temperature valve 6, thus shifting said valve toward closed position and thereby decreasing the amount of low temperature fluid delivered to the main conduit from the low temperature conduit 1, and thus raising the temperature in the main conduit. This will cause the mercury in both legs of the U-tube to return to a common level, thus breaking contact with electrode 59, opening switch 37 and stopping the motor.

It will be perceived that it is only when the contact points 19 are off of the brass strips 21 that the clutch 23 is energized, and likewise it is only when the contact points 19 are off of the brass strips 28 that the clutch 30 is energized, and hence when the contact points 19 are in their medial position bearing upon brass strips 21 and 28 neither of said clutches are energized and the revolution of the power shaft 14 acts only to shift the arm 18 from its medial position. As soon, however, as the contact points 19 leave either the brass strips 21 or 28, the clutch 23 or 30, as the case may be, is immediately energized and the shaft which operates the valve in connection with said clutch is actuated. It therefore follows that if the motor has been stopped when the arm 18 is shifted from its medial position only the valve toward which it has been shifted is in operative relation with the motor. For example, if the arm 18 is shifted toward the high temperature valve and it is desired to lower the temperature, this can be accomplished by moving the high temperature valve toward closed position; or, if it is desired to increase the temperature, by moving said valve toward its open position.

Should the arm 18 be shifted around to its extreme position, or to the position which would give the extreme throw to either the high or the low temperature valve, it is desirable that the motor should be stopped in order to avoid the straining of the parts or the burning out of the motor, and this is accomplished by the automatic stop switches 63 or 64, as the case may be, the arm 72 or 73 contacting with the pins 70 or 71 and acting to open the automatic stop switch corresponding to said pins and thus breaking the circuit to the motor and stopping the same. It will thus be observed that after the device is once set in operation by the workman in charge, it will automatically control the temperature in the main conduit, and experience has demonstrated that minute variations in said main conduit, even so small as the fractional part of a degree will be sufficient to shift one or the other of the valves 6 or 7 so as to correct the slight variation in the main conduit, the whole working automatically without any further attention whatever from the operator.

It will be understood that the expressions "high temperature" and "low temperature" herein employed, are merely relative, indicating that the temperature in one of the conduits is above that desired in the main conduit, while the temperature in the other conduit is below that desired in said main conduit, and not as indicating that one is excessively high or the other excessively low.

While in the diagrammatic drawing, Fig. 1, but a single still is shown, it must not be understood that the use of the device is limited to a single still, as several such devices may be employed in connection with a series of stills. For example, in Fig. 6 is illustrated a series of three stills 97, 98 and 99, and leading through the boiler 100 is a pipe 101 entering a superheater 102, while a branch pipe 103 leads off from the pipe 101 before it enters the superheater. Leading from the superheater is a pipe 104 conveying superheated steam. The pipe 103 is supplied with boiler steam, and constitutes the low temperature conduit, while the pipe 104 is supplied with superheated steam, and constitutes the high temperature conduit. These two pipes are controlled by valves 105, 106, respectively, which valves are operated by the valve-regulating motor-mechanism 107 of the type and construction illustrated in Figs. 1—5, inclusive, to regulate the temperature of the steam passing through the main conduit 108 leading directly into the still 97.

After passing through the coils of the still 97 the steam in said main conduit will have its temperature materially reduced, and is conducted by way of conduit 109 to still 98. Pipes 110, 111, having normally closed valves 110′, 111′, communicate with main conduit 109 leading into the still 98, and by the operation of the valve-regulating motor-mechanism 112 the amount of boiler steam or superheated steam necessary to lower or raise the temperature in the still 98 to the desired point is admitted to the conduit 109. In this way the temperature of the heating medium passing out of still 97 and through pipe 109 is lowered or raised to a temperature which it is desired shall prevail in the coil of the still 98. In a similar way the temperature of the steam issuing by way of pipe 113 from still 98 is lowered or raised by the admission of boiler steam from pipe 103 or superheated steam from the branch pipe 114 by means of valve-operating and regulating device 115, so that the steam flowing through conduit 113 into still 99 shall be maintained at the desired temperature.

It is not essential that the temperature in the three stills 97, 98, 99 should be the same, since by adjusting the U-tube in connection with each of the valve-operating mechanisms 107, 112, 115, different temperatures may be supplied to the three stills, though, if desired, the three regulators may be adjusted for the same temperature in each of the stills.

It will be apparent that the office of the valve-adjusting and regulating devices 112 and 115 will be that merely of operating the valves which control the supply of steam flowing through pipes 110—111 or 103—114 into the stills 98—99, respectively, so that should it be desired to invariably raise or invariably lower the temperature before the steam enters the next still the valves controlling the steam supply not used may be ignored or omitted.

Preferably the steam issuing from the last still in the series is connected by a pipe, as 117, to a receptacle for condensed steam, 118 which is in direct connection with the boiler in order that the heat of the water resulting from the condensed steam may be thus economized and hot rather than cold water supplied to the boiler.

The valve mechanisms 107, 112 and 115 diagrammatically shown in Fig. 6 are such as are shown in full detail in Figs. 1 to 5, but it is not to be understood that it is at all essential, so far as the operation of valve mechanisms 112 and 115 are concerned, that the current of heating or refrigerating medium passing through conduit 108 and the still 97 shall have its origin by the inter-mixture of high and low temperature mediums through the means of the particular valve mechanism shown in Figs. 1 to 5; nor is it essential that the cooling or refrigerating medium flowing through conduit 109 shall have been previously employed in a still or have been composed of a mixture of high and low temperature mediums. It is only essential that there shall be a conduit of the character of that indicated at 108 leading into a still, as 98, the heat medium in which conduit it may be found desirable to raise or lower for the purposes for which it is to be applied in the still or other chamber to which it is to be conducted. In other words, the valve mechanism of Figs. 1 to 5 inclusive, and diagrammatically shown at 112 and 115, is applicable to any current of heating or refrigerating medium which is being conducted to the still, or other chamber or locality where it is to be employed without regarding the origin of said current or medium, and without regard to whether it has been previously utilized for any purpose or not.

In some conditions of use branches from the high and low temperature conduits may be led into the main conduit in advance of the point where the high and low temperature conduits controlled by the automatic mechanism enter said main conduit. Thus in Fig. 6, 120 and 121 are branch pipes leading from the high and low temperature conduits respectively to the main conduit 113 and each being controlled by a hand-operated valve as shown. By this means the temperature of the medium in conduit 113 can be regulated to approximately the degree it is desired to have when it enters still 99, the precise degree desired being secured through the automatic action of valve-regulating mechanism 115.

What I claim is:

1. The combination of a main conduit, high and low temperature conduits leading thereinto, independent valve mechanisms controlling said high and low temperature conduits, a motor, means separately connecting said motor to each of said valve mechanisms, and a thermostatic device subject to the temperature in or emanating from said main conduit and controlling the operation of said motor.

2. The combination of a main conduit, and high and low temperature conduits leading thereinto, with independent valve mechanisms controlling said high and low temperature conduits, an electric motor, means separately connecting each of said valve mechanisms to said motor, and a thermostatic device subject to the temperature in or emanating from said main conduit and controlling the admission of current to and the direction thereof through the motor.

3. The combination of a main conduit and high and low temperature conduits, with separate valves controlling said high and low temperature conduits, a motor, a shaft driven thereby, means separately connecting said shaft to said valves, and a thermostatic device subject to the temperature in or emanating from said main conduit and controlling the starting, stopping and direction of movement of said motor.

4. The combination of a main conduit, high and low temperature conduits, and separately operable valves in said high and low temperature conduits, with the motor, a power shaft driven thereby, clutch mechanism independently connecting said power shaft to said valves, and a thermostatic device subject to the temperature in or emanating from the main conduit and controlling the admission of power to and the direction of movement of said motor.

5. The combination of a main conduit, high and low temperature conduits connected thereto, a valve in each of said last named conduits, a motor, a power shaft driven thereby and normally disconnected from said valves, and means controlled by said power shaft and operating to connect one or the other of said valves to said shaft.

6. The combination of a main conduit, a high and a low temperature conduit delivering thereinto, valves controlling each of said high and low temperature conduits, a motor normally disconnected from said valves, means for connecting the high and means for connecting the low temperature valve to said motor upon the operation of said motor, and means for admitting power to said motor to operate it in either direction.

7. The combination of a main conduit, a high and a low temperature conduit delivering thereinto, valves controlling each of said high and low temperature conduits, a motor normally disconnected from said valves, means for connecting the high and means for connecting the low temperature valve to said motor upon the operation of said motor, and manually operated means for admitting power to said motor to operate it in either direction.

8. The combination of a main conduit, a high and a low temperature conduit delivering thereinto, valves in said last named conduits, a motor operatively connected to one of said valves, means controlling the admission of power to and cutting off power from said motor, automatically operated devices controlling said means, and manually operated devices for preliminarily controlling said means to initially adjust said valve.

9. The combination of a main conduit, high and low temperature conduits leading thereinto, a valve controlling said high temperature conduit, a motor operatively connected to said valve, manually operated means admitting power to said motor in either direction to adjust said valve so as to secure the desired degree of temperature in the main conduit, and automatic means admitting power to said motor to operate it in either direction to maintain the desired temperature in the main conduit.

10. The combination of a main conduit conveying a medium subject to temperature variation, a chamber through which said main conduit passes and in which the temperature of the medium in the main conduit is changed, a second chamber through which said main conduit also passes, a second conduit leading into the main conduit after the latter leaves said first chamber said second conduit conveying a medium for varying temperature, a valve in said second conduit, a motor operatively connected to said valve, and a thermostatic device exposed to the temperature in or emanating from said main conduit and controlling the operation of said motor.

11. The combination of a series of stills, a boiler, and a superheater with a conduit leading boiler steam through said superheater, a second conduit conveying boiler steam, a valve controlling said boiler steam conduit and a valve controlling said superheated steam conduit, a third or main conduit into which said last mentioned conduits lead, said main conduit leading through the stills of said series, a motor operatively connected to said valves, a thermostatic device controlling said motor, a second conduit-conveying superheated steam to said main conduit, a second conduit conveying boiler steam to said main conduit, each of said last named conduits leading into the main conduit after it leaves the first still of the series, valves controlling said last named superheated and boiler steam conduits, a motor operatively connected to said last mentioned valves, and a thermostatic device exposed to the temperature in or emanating from said main conduit and controlling said motor.

12. The combination of a main conduit conveying a medium subject to temperature variation, a second conduit leading into the main conduit and conveying a medium of higher degree in temperature than that in the main conduit, a third conduit also leading into the main conduit and conveying a medium of lower degree in temperature than that of the main conduit, valves controlling said second and third conduits, a motor in operative relation with said valves and capable of operating the same independently, and a thermostatic device exposed to the temperature in or emanating from the main conduit and controlling the operation of said motor.

13. The combination of a plurality of chambers, a main conduit passing through said chambers, a high and a low temperature conduit each leading into said main conduit at a point between two of said chambers, independent valves controlling said high and low temperature conduits, a motor operatively connectible to either of said valves, a thermostatic device exposed to the temperature in or emanating from the main conduit and controlling the application of power to said motor, and means automatically connecting one or the other of said valves to the motor when the latter is operated.

14. The combination of a plurality of chambers, a main conduit passing through said chambers, a high and a low temperature conduit each connected to said main conduit by a plurality of branches intermediate two of said chambers, manually operable valve in one member of each of the said high and low temperature branches, and independently operable automatic valve devices controlling each of the other high and low temperature branches, and thermostatic means subject to the temperature in or emanating from the main conduit at a point adjacent to or within the second of said two chambers and controlling said automatic valve devices.

15. The combination of two chambers, a main conduit conveying a medium subject to temperature variation and passing from one chamber to the other, a second conduit leading into the main conduit and conveying a medium differing in temperature from that in the main conduit, a valve controlling said second conduit, a motor in operative relation with said valve, and a thermostatic device subject to the temperature of or emanating from the medium in the main conduit and automatically controlling the admission of power to said motor.

In testimony whereof I have signed this specification in the presence of two subscribing witnesses.

WILLIAM B. D. PENNIMAN.

Witnesses:
 JACOB VEAX,
 ROBT. H. MARKEY.